(12) United States Patent
Fu et al.

(10) Patent No.: US 11,747,031 B2
(45) Date of Patent: Sep. 5, 2023

(54) KITCHEN AIR CONDITIONING SYSTEM

(71) Applicant: Ningbo Fotile Kitchen Ware Co., Ltd., Ningbo (CN)

(72) Inventors: Haifeng Fu, Ningbo (CN); Bingsong Yu, Ningbo (CN); Ang Li, Ningbo (CN); Qihui Zhu, Ningbo (CN); Yaqun Cao, Ningbo (CN)

(73) Assignee: Ningbo Fotile Kitchen Ware Co., Ltd., Ningbo (CN)

( * ) Notice: Subject to any disclaimer, the term of this patent is extended or adjusted under 35 U.S.C. 154(b) by 475 days.

(21) Appl. No.: 17/250,531

(22) PCT Filed: Aug. 2, 2019

(86) PCT No.: PCT/CN2019/098971
§ 371 (c)(1),
(2) Date: Feb. 1, 2021

(87) PCT Pub. No.: WO2020/025035
PCT Pub. Date: Feb. 6, 2020

(65) Prior Publication Data
US 2021/0318003 A1 Oct. 14, 2021

(30) Foreign Application Priority Data
Aug. 2, 2018 (CN) .......................... 201810867383.0

(51) Int. Cl.
*F24F 5/00* (2006.01)
*F24C 15/20* (2006.01)
*F24F 13/06* (2006.01)
*F24F 13/30* (2006.01)

(52) U.S. Cl.
CPC ............ *F24F 5/0096* (2013.01); *F24C 15/20* (2013.01); *F24F 5/001* (2013.01); *F24F 13/06* (2013.01); *F24F 13/30* (2013.01); *F24F 2221/14* (2013.01)

(58) Field of Classification Search
CPC .......... F24F 5/0096; F24F 5/001; F24F 13/06; F24F 13/30; F24F 2221/14; F24F 12/002; F24C 15/20; Y02B 30/56
See application file for complete search history.

(56) References Cited

FOREIGN PATENT DOCUMENTS

| CN | 202171272 U | * | 3/2012 |
| CN | 205227462 U | * | 5/2016 |
| CN | 205606685 U | * | 9/2016 |
| CN | 206347622 U | * | 7/2017 |

* cited by examiner

*Primary Examiner* — Emmanuel E Duke
(74) *Attorney, Agent, or Firm* — Wang Law Firm, Inc.

(57) ABSTRACT

A kitchen air-conditioning system comprises a air-conditioning assembly and a range hood assembly; the air-conditioning assembly comprising a compressor, a first heat exchanger and a second heat exchanger which are connected with each other through a plurality of refrigerating medium pipes; and the air-conditioning assembly has a fresh air inlet and a fresh air outlet, the fresh air coming from the fresh air inlet is divided into two paths; the fresh air entering the first heat exchanger flows into the kitchen through the fresh air outlet, and the fresh air entering the air intake area cools the third heat exchanger in the range hood assembly and is then exhausted to the outside through the range hood, which is helpful to reduce the intake-air temperature of the second heat exchanger, thereby improving the energy efficiency of the air conditioner.

10 Claims, 1 Drawing Sheet

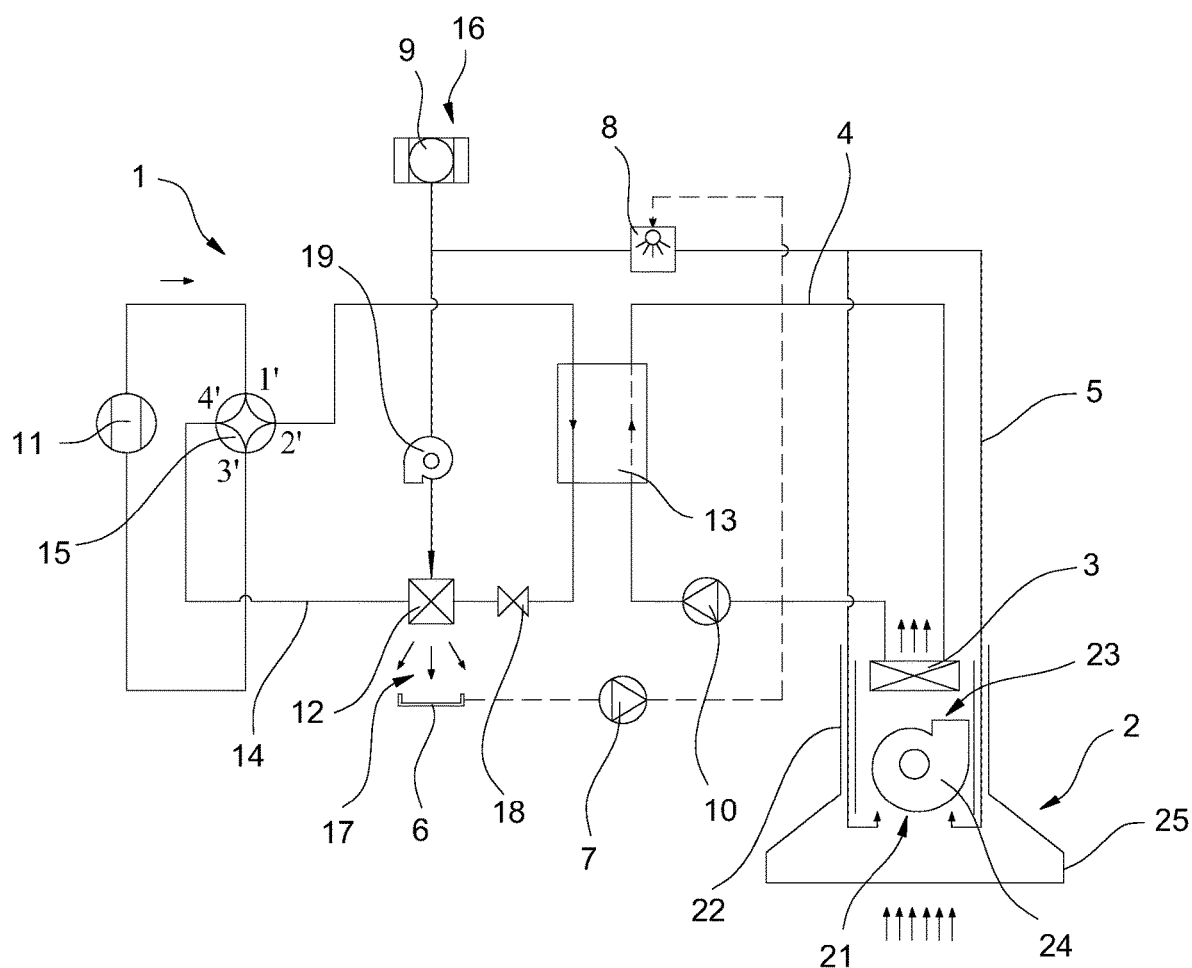

KITCHEN AIR CONDITIONING SYSTEM

TECHNICAL FIELD OF THE INVENTION

The present invention relates to a kitchen air-conditioning system, in particular to a kitchen air-conditioning system capable of cooling air inside the kitchen.

BACKGROUND OF THE INVENTION

As a main place for people to cook, the kitchen air environment directly affects the mood of the cook. Especially in summer, the sultry kitchen environment brings great discomfort to the cook. Accordingly, various kitchen air-conditioners have been proposed to cool the kitchen.

There is no significant difference between the existing kitchen air-conditioners and common air conditioners. There are generally two forms of kitchen air-conditioners. One form is split kitchen air-conditioner. That is, the outdoor unit is located outdoors, the indoor unit is located indoors, and the indoor and outdoor units each have a motor fan. The connection of the indoor and outdoor units in the split kitchen air-conditioner is realized by pipelines. Such a connection requires the formation of a hole on the wall, which destroys the decoration. Since the outdoor unit is hung outdoors, the structure is not compact enough and it is less aesthetically pleasing. The other form is integrated kitchen air-conditioner. That is, a dual-axis motor or two motors may be used. The integrated kitchen air-conditioner usually comprises a portable air conditioner and a window unit. When the portable air conditioner is used, it needs to be manually connected to the heat dissipation hose, and then the hose needs to be placed outside the window, which is inconvenient to use. It is necessary to form a large square hole on the wall, into which the window unit is placed. When not in use, the window unit may be moved from the hole. Although the square hole may be blocked with other things, it is messy and it destroys the decoration.

During the operation of the range hood, the fan system sucks fume from the cooking area and exhausts it to the flue. Although the fume is cleared, negative pressure may be formed in the interior space of the kitchen. At present, to solve this problem, people usually open the kitchen window or slide door to supplement air to the kitchen. Such an air supplementation method is relatively simple and direct, but air cannot be supplemented to the inside of the range hood and the supplemented air may interfere with the burning flame of the stove burner. In addition, the existing kitchen air-conditioning system cannot supplement air to the range hood through the air-conditioning assembly, let along the improvement to the energy efficiency of the air conditioner by well combining air supplementation and heat exchange.

SUMMARY OF THE INVENTION

It is a first object of the present invention to provide a kitchen air-conditioning system that combines fresh air supplementation and heat exchange.

It is a second object of the present invention to provide a kitchen air-conditioning system that can reduce the intake-air temperature of the heat exchanger in the range hood assembly by the condensed water from the evaporator and further improve the energy efficiency of air-conditioning.

For achieving the first object, the kitchen air-conditioning comprises: an air-conditioning assembly and a range hood assembly; the air-conditioning assembly comprising a compressor, a first heat exchanger and a second heat exchanger which are connected with each other through a plurality of refrigerating medium pipes; wherein, a four-way valve is disposed on a first refrigerating medium pipe; a third heat exchanger is disposed on the range hood assembly, the third heat exchanger and the second heat exchanger are connected through a secondary refrigerant pipe; and the air-conditioning assembly has a fresh air inlet and a fresh air outlet, the fresh air coming from the fresh air inlet is divided into two paths, a first path of fresh air flows through a first heat exchanger and the fresh air outlet and finally flows into the interior space of the kitchen, a second path of fresh air flows into an air intake area of the range hood assembly.

Preferably, the second path of fresh air flows into the air intake area through an air pipe.

Further preferably, the range hood assembly comprises a fan with an air inlet, a fume collecting hood with an air inlet, and a fan cover; the air intake area locates between the air inlet of the fume collecting hood and the air inlet of the fan; the air pipe extends along an inner wall of the fan cover, downward to the air intake area.

In order to achieve the second object, preferably, the first heat exchanger is an evaporator and the second heat exchanger is a condenser, a condensed water tray is disposed below the first heat exchanger; the system further comprises a water pump and a sprayer, the water pump is configured to pump the water in the condensed water tray into the sprayer, and the sprayer is disposed on the air pipe.

To ensure the fresh air flows into the interior space of the kitchen cleaner, preferably, a purifier is disposed in the air pipe between the fresh air inlet and the fresh air outlet.

The air-conditioning assembly may be disposed in many positions in the kitchen. Preferably, the kitchen has a kitchen ceiling, the air-conditioning assembly is disposed above the kitchen ceiling, and the fresh air outlet is disposed on the kitchen ceiling.

The third heat exchanger may be disposed in many positions. Preferably, as a preferred solution, the fan has a rear air channel, the third heat exchanger is disposed in the rear air channel of the fan. In this way, the heat energy exchanged by the third heat exchanger can be exhausted through the air outlet of the fan of the range hood. This is helpful to improve the cooling effect of the air-conditioning assembly.

Preferably, as another preferred solution, the third heat exchanger is disposed inside the fan of the range hood assembly.

Further preferably, a driving pump is disposed on the secondary refrigerant pipe to drive secondary refrigerant water to circulate in the secondary refrigerant pipe. The secondary refrigerant may be water or other refrigerants such as ethylene glycol or glycerol.

As a preference of any of the above solutions, a throttle valve is disposed on one of the plurality of refrigerating medium pipes between the first heat exchanger and the second heat exchanger.

Compared with the prior art, the present invention has the advantage that: the outdoor fresh air of the kitchen air-conditioning system can enter the first heat exchanger and the air intake area of the range hood assembly in two paths, the fresh air entering the first heat exchanger is supplemented into the interior space of the kitchen through the fresh air outlet, and the fresh air entering the air intake area cools the third heat exchanger in the range hood assembly and is then exhausted to the outside through the range hood. Since the second heat exchanger and the third heat exchanger of the air-conditioning assembly are connected through the secondary refrigerant pipe, the third heat exchanger is cooled, which is helpful to reduce the intake-air temperature of the second heat exchanger, thereby improving the energy efficiency of the air-conditioning.

BRIEF DESCRIPTION OF THE DRAWINGS

FIG. 1 is a perspective view of a kitchen air-conditioning system according to an embodiment of the present invention.

DETAILED DESCRIPTION OF THE INVENTION

The present invention will be further described below in detail with reference to the accompanying drawings by embodiments.

FIG. 1 shows a preferred embodiment of the kitchen air-conditioning system of the present invention. The kitchen air-conditioning system comprises an air-conditioning assembly 1 and a range hood assembly 2. The air-conditioning assembly 1 and the range hood assembly 2 communicate with each other.

The air-conditioning assembly 1 comprises a compressor 11, a first heat exchanger 12 and a second heat exchanger 13 which are connected with each other through a plurality of refrigerating medium pipes 14, a four-way valve 15 is disposed on a first refrigerating medium pipe 14, and a throttle valve 18 is disposed on the refrigerating medium pipe 14 between the first heat exchanger 12 and the second heat exchanger 13. The detail structure of the above-mentioned components of the air-conditioning assembly 1 is the same as the structure of the existing air conditioner, and will not be repeated here.

The range hood assembly 2 in this embodiment is a range hood. The range hood assembly 2 comprises a fan 24 with an air inlet, a fume collecting hood 25 with an air inlet, and a fan cover 22. A third heat exchanger 3 is disposed on the range hood assembly 2. For example, the third heat exchanger 3 can be disposed in a rear air channel 23 at the rear end of the fan 24 of the range hood, or can be disposed inside the fan 24 of the range hood.

The third heat exchanger 3 and the second heat exchanger 13 are connected through a secondary refrigerant pipe 4. A driving pump 10 is disposed on the secondary refrigerant pipe 4 to drive secondary refrigerant water to circulate in the secondary refrigerant pipe 4. Generally, the secondary refrigerant may be water, ethylene glycol, or glycerol, etc.

The air-conditioning assembly 1 in this embodiment has a fresh air inlet 16 and a fresh air outlet 17, the fresh air coming from the fresh air inlet 16 is divided into two paths, that is a first path and a second path. The first path of fresh air flows through the first heat exchanger 12 and the fresh air outlet 17 and finally flows into the interior space of the kitchen by an outlet fan 19 of the first heat exchanger 12. The second path of fresh air passing through the second heat exchanger 13, meets the air blown by an outlet fan (not shown in figures) of the second heat exchanger 13, and flows into an air intake area 21 of the range hood assembly 2 through an air pipe 5. Specifically, the air intake area 21 locates between the air inlet of the fume collecting hood 25 and the air inlet of the fan 24; the air pipe 5 extends along an inner wall of the fan cover 22, downward to the air intake area 21.

In this embodiment, the kitchen has a kitchen ceiling (not shown), the air-conditioning assembly 1 is disposed above the kitchen ceiling, and the fresh air outlet 17 is disposed on the kitchen ceiling. In addition, in order to purify the fresh air supplemented into the kitchen, a purifier 9 is disposed in the air pipe between the fresh air inlet 16 and the fresh air outlet 17.

A condensed water tray 6 is disposed below the first heat exchanger 12. The system further comprises a water pump 7 and a sprayer 8, the water pump 7 is configured to pump the water in the condensed water tray 6 into the sprayer 8, and the sprayer 8 is disposed on the air pipe 5.

The kitchen air-conditioning system has following three operating modes.

1) Refrigeration+Range Hood Mode

In this mode, in the four-way valve, way-1' communicates with way-2', and way-3' communicates with way-4'; the first heat exchanger 12 is used as an evaporator; the second heat exchanger 13 is used as a condenser; and the fresh air from the purifier 9 is divided into two paths, the first path of fresh air and the second path of fresh air. The first path of fresh air enters, after being purified, the evaporator to be cooled and dehumidified, and is then supplemented from the fresh air outlet 17 to the kitchen, and the low-temperature condensed water produced by dehumidification is collected in the condensed water tray 6.

The second path of fresh air does not need to be purified. The condensed water in the condensed water tray 6 is pumped by the water pump 7 to the sprayer 8 to mix with and cool the second path of fresh air. The second path of fresh air then enters the condenser, and is then supplied to the air intake area of the range hood by the air pipe 5, where it is mixed with the fume from the stove, then sucked by the fan 24 of the range hood to cool the third heat exchanger 3 inside the range hood, and finally exhausted from the fan 24. In this process, since the intake-air temperature of the condenser is reduced, the energy efficiency of the air conditioner is improved.

2) Heating+Range Hood Mode

In this mode, in the four-way valve, way-1' communicates with way-4', and way-2' communicates with way-3'; the first heat exchanger 12 is used as a condenser; and the second heat exchanger 13 is used as an evaporator. The purified air, which is heated by the condenser, enters the interior space of the kitchen to warm the kitchen in winter. The air out of the condenser is finally sucked by the fan 24 of the range hood. The cold energy of the evaporator is transferred to the third heat exchanger 3 by the driving pump 10. The third heat exchanger 3 is heated by both the introduced fresh air and the exhausted air from the range hood. The mixed air is finally exhausted to the outside by the fan 24.

3) Purified Fresh Air Ventilation Mode

In this mode, the air-conditioning assembly and the range hood are turned off, the first heat exchanger 12 and the fan 24 of the range hood are turned on, and the purified fresh air flows into the kitchen and finally exhausted to the outside by the fan 24 of the range hood.

The invention claimed is:

1. A kitchen air-conditioning system, comprising an air-conditioning assembly (1) and a range hood assembly (2);
   the air-conditioning assembly (1) comprising a compressor (11), a first heat exchanger (12) and a second heat exchanger (13) which are connected with each other through a plurality of refrigerating medium pipes (14);
   wherein,
   a four-way valve (15) is disposed on a first refrigerating medium pipe (14);
   a third heat exchanger (3) is disposed on the range hood assembly (2), the third heat exchanger (3) and the second heat exchanger (13) are connected through a secondary refrigerant pipe (4);

and the air-conditioning assembly (1) has a fresh air inlet (16) and a fresh air outlet (17), the fresh air coming from the fresh air inlet (16) is divided into two paths, a first path of fresh air flows through a first heat exchanger (12) and the fresh air outlet (17) and finally flows into the interior space of the kitchen, a second path of fresh air flows into an air intake area (21) of the range hood assembly (2).

2. The system of claim 1, wherein the second path of fresh air flows into the air intake area (21) through an air pipe (5).

3. The system of claim 2, wherein the range hood assembly (2) comprises a fan (24) with an air inlet, a fume collecting hood (25) with an air inlet, and a fan cover (22);
the air intake area (21) locates between the air inlet of the fume collecting hood (25) and the air inlet of the fan (24);
the air pipe (5) extends along an inner wall of the fan cover (22), downward to the air intake area (21).

4. The system of claim 2, wherein the first heat exchanger (12) is an evaporator and the second heat exchanger (13) is a condenser, a condensed water tray (6) is disposed below the first heat exchanger (12);
the system further comprises a water pump (7) and a sprayer (8), the water pump (7) is configured to pump the water in the condensed water tray (6) into the sprayer (8), and the sprayer (8) is disposed on the air pipe (5).

5. The system of claim 1, wherein a purifier (9) is disposed in the air pipe between the fresh air inlet (16) and the fresh air outlet (17).

6. The system of claim 1, wherein the kitchen has a kitchen ceiling, the air-conditioning assembly (1) is disposed above the kitchen ceiling, and the fresh air outlet (17) is disposed on the kitchen ceiling.

7. The system of claim 1, wherein the fan (24) has a rear air channel (23), the third heat exchanger (3) is disposed in the rear air channel (23) of the fan (24).

8. The system of claim 1, wherein the third heat exchanger (3) is disposed inside the fan (24) of the range hood assembly (2).

9. The system of claim 1, wherein a driving pump (10) is disposed on the secondary refrigerant pipe (4) to drive secondary refrigerant water to circulate in the secondary refrigerant pipe (4).

10. The system of claim 1, wherein a throttle valve (18) is disposed on one of the plurality of refrigerating medium pipes (14) between the first heat exchanger (12) and the second heat exchanger (13).

* * * * *